Patented Aug. 11, 1942

2,292,506

UNITED STATES PATENT OFFICE 2,292,506

MANUFACTURE OF TITANIUM SALT SOLUTIONS

L'Roche G. Bousquet, Baldwin, and Maxwell J. Brooks, New York, N. Y., assignors to General Chemical Company, New York, N. Y., a corporation of New York No Drawing. Application March 29, 1940, Serial No. 326,673

11 Claims. (Cl. 23—202)

This invention deals with manufacture of crystalloidal, relatively low acidity factor titanium salt solutions. The invention relates generally to methods for reducing the acidity factor of crystalloidal titanium salt solutions without disturbing their crystalloidal characteristics. More particularly, the invention is directed to methods for making, from crystalloidal relatively high acidity factor titanium salt solutions crystalloidal titanium salt solutions having within certain limits any desired lower acidity factor, for example crystalloidal titanium salt solutions having acidity factors of around zero or even substantially less than zero, i. e. a minus acidity factor. While applicable to production of low acidity factor titanium salt solutions in general, for convenience and purpose of illustration the principles of the invention are herein discussed largely in connection with titanium sulfate solutions.

As known in the art relating to production and use of titanium sulfate solutions, percent "acidity factor" or "factor of acidity" (represented by F. A.) of a titanium sulfate solution is the ratio (multiplied by 100) of the so-called free $H_2SO_4$, (i. e., acid not combined with bases or with titanium as $TiOSO_4$) and the titanium equivalent acid based on $TiOSO_4$, (i. e., the acid constituent of $TiOSO_4$ as such). Free acid plus acid combined with titanium to form $TiOSO_4$ as such is designated "active acid." In terminology of the art, zero F. A. represents a condition in which all titanium in solution is present as titanyl sulfate ($TiOSO_4$), and 100% F. A. represents a condition in which all titanium is present as normal tetravalent titanium disulfate, $Ti(SO_4)_2$. Titanium sulfate solution containing less acid than needed to combine with bases other than titanium and to form $TiOSO_4$ with the titanium present is designated as having a minus acidity factor. For example, in a case where solution conditions are such that substantially all of the titanium has been precipitated out as hydrate, e. g. as a result of neutralization of all of the acid, F. A. of the mother liquor is about minus 100%. Similarly, F. A. of a titanium chloride solution is the ratio (multiplied by 100) of the so-called free HCl (i. e. acid not combined with bases or with titanium as $TiOCl_2$) and the titanium equivalent acid based on $TiOCl_2$ (i. e. the acid constituent of $TiOCl_2$ as such).

The crystalloidal state of titanium salt solutions is characterized by absence of colloidal titanium compound. A satisfactory test for absence of colloidal titanium is that which shows the absence of coagulated titanium when a sample of the solution to be tested is treated with an equal volume of standard C. P. concentrated (35–37%) hydrochloric acid. In practice of this test, any colloidal titanium in the sample is coagulated immediately on addition of hydrochloric acid. Should colloidal titanium content of the sample be substantial, coagulated material though suspended and unsettled is readily visible to the naked eye. If no coagulated material is visible the hydrochloric acid treated sample may be settled for a substantial period of time and filtered or centrifuged in a high-speed centrifuge. If analysis of the filtrate or of the centrifuged liquor shows the same total titanium (calculated as $TiO_2$) content by weight as did the sample prior to hydrochloric acid dilution, the sample tested contained no colloidal titanium. If analysis of the filtrate or the centrifuge liquor shows appreciably less total titanium than that of the sample prior to hydrochloric acid dilution, it will be evident the sample contained colloidal titanium in amount corresponding with the total titanium deficiency of the filtrate or centrifuge effluent subjected to analysis.

In practice, occasions arise in which it is desirable to have available crystalloidal titanium sulfate solutions of moderately low acidity factor say 40–60%, or of acidity factor in the neighborhood of zero or below. It is known that titanium sulfate solutions having acidity factors of the order of say 35–30% or possibly lower can be made by direct sulfuric acid attack on titaniferous ores. This procedure has two serious commercial disadvantages. First, in order to obtain low acidity factor it is necessary to use such a relatively small amount of sulfuric acid that titanium recovery from the ore is too low for commercial purposes. Second, solutions themselves produced in this way, while having relatively low acidity factor, almost invariably contain titanium in colloidal form with the result that, as known, such solutions are notoriously unstable on account of premature hydrolysis initiated by the presence of colloidal titanium.

Literature and patents describe production of solutions having low acidity factor, e. g., almost as low as zero. While F. A. may be low, such solutions are not crystalloidal because of presence of colloidal titanium compound. Further, it is known that acidity factor of a usual stock high F. A., e. g. 60–90%, titanium sulfate solution may be reduced by treatment of the same with acid binding or neutralizing agents. While possible by use of such materials to reduce F. A. of crystalloidal, high acid titanium sulfate solution to near zero, on account of the high colloidal titanium compound content formed as an unavoidable result of the way in which prior methods involving treatment of high acidity factor solutions with acid binding agents are carried out, low F. A. solutions produced by prior art methods contain large amounts of titanium in colloidal form, and hence are non-crystalloidal and extremely unstable. It is because of presence of colloidal titanium and resulting instability that solutions made by these prior neutralizing methods are said to be useful as seeding agents in hydrolytic precipitation of metatitanic acid from titanium sulfate solutions. No previously described prior methods of which we are aware afford production of low acidity factor titanium sulfate solutions from crystalloidal high acidity factor titanium sulfate solutions by means of acid binding agents without producing low acidity factor solutions which are colloidal.

In the present state of the art by far the bulk of titanium used is obtained by direct sulfuric acid attack on ores such as ilmenite. It is customary, in order to obtain satisfactory titanium extraction from ore and to form crystalloidal titanium sulfate solutions which are stable and will not hydrolyze on storage, to use acid in quantity to form titanium sulfate solution having acidity factor from above say 55 to 100%, general practice being such that crude titanium sulfate solutions resulting from ore-acid digestion operation have acidity factors in the range of about 60–85%. Relatively high acidity factor solutions of this general type constitute the commercially more satisfactory starting solutions for making crystalloidal low acidity factor solutions since such high acidity factor solutions are not only crystalloidal but are made in a way affording satisfactory titanium recovery from ore.

One of the principal objects of this invention is to provide methods for reducing acidity factor of crystalloidal titanium salt solutions without disturbing their crystalloidal status and to thereby make possible production of crystalloidal titanium salt solution having acidity factor lower than that of the initial crystalloidal titanium salt starting solution. Another object is to afford methods for reducing acidity of crystalloidal titanium salt solutions in such a way as to prevent colloidal titanium compound formation during acidity reduction. The invention further aims to provide methods for making crystalloidal titanium salt solutions of low acidity factor from crystalloidal relatively high acidity factor titanium salt solutions by treatment of the same with an acid binding or neutralizing agent.

In carrying out the invention as applied to production of low acidity factor titanium sulfate, a crystalloidal titanium sulfate solution used as starting or initial solution may be one of any suitable relatively high acidity factor. For example, such a solution may be prepared by digesting ground ilmenite with sulfuric acid, dissolving the digest cake in water, separating solid residue, concentrating and cooling to remove part of the iron as $FeSO_4.7H_2O$ and clarifying the liquor, all as known in the art. We reduce acidity factor of the resulting starting solution by incorporating a basic compound, i. e. iron carbonate, reactable with $SO_4$ radical of the titanium sulfate solution to reduce acidity. Treatment of starting solution is carried out in accordance with subsequently detailed procedure, involving use of iron carbonate and certain maximum operating temperatures, to reduce acidity factor to the desired extent and at the same time prevent formation of any colloidal titanium compounds. Procedure we have discovered is such as to make it feasible to first secure satisfactory titanium extraction from titaniferous ores by fully adequate amount of acid with resultant production of crystalloidal titanium sulfate solution having high titanium concentration and relatively high acidity factor. Using a solution of this nature as starting solution, in accordance with the present improvements it is then possible to produce a crystalloidal titanium sulfate solution having within certain limits any desired predetermined lower acidity factors. In practical commercial operations, for reasons not important here, it is often desirable to subject to hydrolysis a titanium sulfate solution (e. g. to precipitate crude metatitanic acid) having acidity factor something less than the acidity factor of a typical titanium sulfate solution formed when titaniferous ores are digested with a sufficiently large quantity of acid as to obtain maximum commercially feasible titanium extraction from ore. The invention thus makes possible to use in an ore-acid digestion operation the most favorable quantities of acid and producing crystalloidal relatively high acid factor titanium sulfate solutions, and thereafter by practice of the invention reduce and adjust acidity factor to provide for example for a hydrolysis operation, a titanium sulfate solution having a desired acidity factor appreciably lower than the acidity factor of the crude titanium sulfate solution obtained from the ore-sulfuric acid digestion operation. The invention similarly provides satisfactory ways for making crystalloidal titanium sulfate solutions having any desirable low acidity factor, for example, production of a crystalloidal titanyl sulfate solution which, it will be understood, has an acidity factor of about zero.

In order to produce crystalloidal low F. A. titanium salt solutions from high F. A. crystalloidal titanium salt solutions by treatment of the same with acid binding agents, the feature of first importance is prevention of formation of any, even very small amounts of colloidal titanium compounds. Investigations show that once colloidal titanium is produced, if only in a highly localized zone of a main solution the acidity factor of which is being reduced, regardless of care with which the subsequent acidity reducing may be carried out, a satisfactory crystalloidal solution is not obtained, apparently because colloidal titanium once formed, although in very small amounts, initiates production of further colloidal titanium in quantity sufficient to prematurely hydrolyze the whole solution.

We have discovered that in effecting prevention of formation of titanium in colloidal form according to the present invention, the first of two closely related and interdependent physical control factors of primary importance is the feature of maximum temperature at which the acidity reducing operation is carried out, and the second is selection of the basic acid binding material used to reduce the acidity factor.

The following described temperature conditions apply to all modifications of the invention. The acidity reduction procedure should be effected while maintaining the reacting mass, of crystalloidal starting solution and acidity reducing medium, at temperature not higher than 60° C. To secure best results in reasonably large-scale work, and to minimize tendency toward formation of colloidal titanium, temperatures should be held preferably below 50° C. Minimum temperature is a matter of operating convenience. Should it be desired to crystallize out more or less reaction by-product, e. g. ferrous sulfate, temperature may be slightly above room temperature, e. g. 30-35° C., according to the degree of fluidity desired in the reacting mass. However, even substantially lower temperatures do not in any way affect crystalloidal character of the solutions made in accordance with the invention.

Investigations upon which this invention is based included study of the effects, with respect to formation of colloidal titanium compounds, of a large number of acid binding or neutralizing agents potentially available for acidity reduction of crystalloidal titanium salt solutions. We have observed that most basic compounds have a marked tendency to cause what is believed to be "over-neutralization" of small portions of crystalloidal solution being treated, and to form in highly localized zones small amounts of colloidal titanium which, regardless of temperature conditions and precautions subsequently taken during the acidity reducing operation, initiate formation of further amounts of colloidal titanium and prevent ultimate production of crystalloidal, low acidity factor titanium salt solutions. We have discovered that iron carbonate, in any form reactable with the acid radical present in the mass being treated, is of itself admirably adapted to effect acidity factor reduction of crystalloidal titanium salt solutions. Our work shows the acidity reducing characteristics and properties of iron carbonate are such that when using this material it is unnecessary to take any special procedural or manipulative precautions to maintain all portions of the reacting mass in crystalloidal form and to prevent formation of colloidal titanium compounds. Thus, we have discovered that the inherent properties of iron carbonate are of such nature that this acidity reducing agent may be incorporated in any mechanical manner with the initial high acidity factor titanium salt solution. On account of the highly pronounced tendency of colloidal titanium compound formation to take place during acidity reduction, the marked practical operating advantages afforded by this invention will be evident.

In practice of the invention, the initial relatively high F. A. starting solution may be any crystalloidal titanium sulfate solution of suitable titanium concentration. Other conditions being equal, the higher the titanium concentration the less the tendency for formation of colloidal titanium. It is preferred to use starting solution of such titanium concentration, calculated as TiO₂, that at any subsequent stage of the process the TiO₂ concentration does not fall below about 65 gpl. Ordinarily, in practice of the process there is some but no relatively large decrease of titanium concentration, but should particular operating conditions be such that a large decrease of titanium concentration takes place, provision for such decrease may be made by selecting an initial starting solution of suitable high TiO₂ concentration. Usually solutions of not less than 100-120 gpl. are sufficiently concentrated and hence such starting solutions are preferred. At concentrations above 350 gpl., solutions as a rule are too viscous to work with conveniently. For best practical results, we prefer to employ starting solutions having TiO₂ concentrations within the range of about 125 to about 210 gpl.

Generally, initial acidity factor of the starting solution is not important, although of course F. A. of the starting solution is higher than the F. A. of the ultimate low acidity factor product solution. As a rule, the initial solution should have acid factor upwards of say 40%, since solutions made by the usual commercial methods of digesting ore and acid and having factors less than about 40% may be unstable and in some cases contain titanium in colloidal form. As stated, the usual run of crystalloidal titanium sulfate stock solutions formed by digesting titaniferous ores and sulfuric acid, have acidity factor in the middle or upper portion of the range of say 50 to 100%. Solutions of this type, when made according to approved plant practice are crystalloidal, have TiO₂ concentrations above 100 gpl., and are well suited for purposes of the present process. The invention is also applicable to production of low acidity factor solutions from initial solutions having higher acidity factors, e. g., well above 100%.

Theoretically, iron content of starting solutions is not strictly material, although practically it is more desirable to use initial solutions relatively low in iron. As known in the art, the iron content of a titanium sulfate solution may be substantially reduced if desired by cooling or by concentrating and cooling and removing ferrous sulfate crystals formed. In the process of this invention, iron carbonate is employed as the acidity reducing agent. Use of iron carbonate necessarily involves introduction into the liquor being treated of further quantities of iron and resultant formation of additional amounts of iron sulfate. When iron content of the initial solution is high, introduction of iron salt to reduce acidity often times increases the iron sulfate content to such a point that even at working temperatures of the invention, substantial quantities of ferrous sulfate crystallize with the result that the reaction mass is likely to become mushy with iron sulfate crystals and inconvenient to handle. Furthermore, such a condition slows down and tends to stop reaction between iron carbonate and the solution being treated on account of equilibrium of salts in solution being obtained. Hence, it is preferable to start with a solution having an iron concentration low enough to permit addition of whatever amount of iron carbonate may be needed to reduce F. A. to the desired degree without reaching saturation of the particular reaction mass with respect to iron. In practice Fe/TiO₂ ratio may range between 0.15 to 0.8, preferably 0.2 to 0.5.

While the invention is applicable to acidity reduction in the presence of ferric iron, it is preferred to effect reaction in the absence of ferric iron. In practice, there are two possible sources of relatively small amounts of ferric iron; namely, in the starting solution itself and in the iron carbonate which is preferably used in the form of a filter cake. We have observed rate of reaction of iron carbonate and acid radical is substantially increased when the acidity reducing reaction is carried out in the absence of ferric iron. Further advantages are that the final low F. A. liquor contains appreciably less residue (unreacted ferric oxide) to be removed by filtration, and also at the end of the reaction addition of some metallic iron to effect reduction of ferric iron in solution is unnecessary. These advantages may be provided for by using a starting solution containing reduced titanium, e. g. titanous sulfate, Ti₂(SO₄)₃. Such a solution may be made by treating an iron containing titanium solution with metallic iron in quantity sufficient to effect formation of the desired amount of titanous sulfate. It will be understood ferric iron does not exist in the presence of titanous sulfate. The starting solutions preferred in the present process are those containing titanous sulfate in quantity to reduce to ferrous sulfate (1) any ferric iron introduced along with the iron carbonate filter cake, and (2) any ferric iron which may be formed during the reaction by incidental oxidation of iron. In usual practice, a starting solution of reduced titanium content of not less than about 10 gpl. is ordinarily sufficient to reduce any ferric iron brought in with the filter cake or incidentally formed during the reaction, to thus insure the absence of ferric iron during acidity reduction.

In subsequent discussion and examples $TTiO_2$ represents total titanium concentration calculated as $TiO_2$, $RTiO_2$ represents reduced titanium (e. g. titanous sulfate), $TH_2SO_4$ represents total $H_2SO_4$, $FH_2SO_4$ represents free $H_2SO_4$, $AH_2SO_4$ represents active $H_2SO_4$, and per cent F. A. represents factor of acidity. Subsequent mention of "$TiO_2$ concentration" is intended to mean titanium concentration calculated as $TiO_2$.

To produce from given high acid factor titanium salt solution a solution of given lower acid factor the amount of iron carbonate needed may be determined by calculation. The only apparatus required for acidity reduction is a reaction vessel equipped with cooling coils arranged to facilitate the temperature maintenance indicated. The carbonate may be charged into the vessel in any desired way, no precaution as to mode of feeding being necessary to avoid formation of colloidal titanium compound. During reaction, $CO_2$ is evolved with resultant foaming, and thus rate of feed of carbonate need be limited only to avoid excessive foaming. In any particular operation, the total amount of carbonate used should not of course exceed that needed to reduce acidity to the predetermined degree. Further, it will be understood that solutions of too low F. A. are unstable, and hence the total amount of carbonate used preferably should not exceed that required to reduce F. A. materially below about minus 35%.

With regard to production of low acid factor titanium sulfate solutions, iron of the carbonate reacts with $SO_4$ radical of the starting solution, forms soluble ferrous sulfate, carbon dioxide is liberated and passes off as gas. In addition to the previously noted operating advantage of major importance, iron carbonate affords other advantages: first, no further impurity is introduced into the reacting mass since commercial titanium sulfate solutions already contain substantial amounts of iron sulfate; further, since $CO_2$ formed passes off there is only a small amount of dilution of the solution being treated, this advantage being basis of production of high $TiO_2$ concentration crystalloidal titanium sulfate solutions of low acid factor.

Iron carbonate in any form, reactable with the acid radical present in the mass being treated, and from any source may be used, the most available being that obtained, for example, by boiling reacting proportions of ferrous sulfate and sodium carbonate to precipitate iron carbonate, settling, water washing several times by decantation, and finally filtering. The cake is slightly basic. Good results are obtained when the iron carbonate is introduced as a moist rather than a very wet filter cake, and our best results have been secured by use of iron carbonate filter cake which has been treated with a dehydrating agent, preferably acetone. We find that if the water-washed iron carbonate filter cake is washed, e. g. while on the filter, with acetone, it is possible to prepare a lower moisture content ferrous carbonate which is very stable in air. It is believed the presence of a small amount of residual acetone prevents oxidation of ferrous carbonate to ferric hydroxide, and eventually ferric oxide. The acetone washed iron carbonate is more reactive because of its higher ferrous Fe, and leaves a smaller amount of unreacted material to be removed by filtration after neutralization of the high acid titanium sulfate solution. Because of the lower water content of acetone washed iron carbonate, there is the added advantage in its use of a smaller dilution of the titanium salt solution being treated. These acetone treated filter cakes, which are slightly basic and contain a minimum of ferric iron, afford markedly satisfactory results. Other dehydrating agents such as ethyl, methyl, or isopropyl alcohols might be used, and dehydration might be accomplished by drying the ferrous carbonate cake in inert gases such as $CO_2$ or nitrogen, preferably under vacuum to avoid excessive temperatures to effect removal of water.

Following is an illustrative example of practice of the invention using basic iron carbonate filter cake prepared from a solution of $FeSO_4$ neutralized with a solution of soda ash.

EXAMPLE 1

The filter cake was made as follows: 45,400 grams of $FeSO_4.7H_2O$ were dissolved in 68.4 liters of water giving 91 liters containing 98.5 gpl. Fe (7.85% by weight) and having specific gravity of 1.25 at 25° C. 17,250 grams of soda ash (58%) were dissolved in 66.5 liters of water producing 76 liters containing 228 gpl. of $Na_2CO_3$ (18.93% by weight) and having specific gravity of 1.2 at 25° C. The soda ash solution was added to the iron sulfate solution, the mixture boiled and settled for a little over 2 hours. About 66% of the total volume was decanted. The settled sludge (slightly basic iron carbonate) had a volume of 55 liters and specific gravity of 1.35 at 60° C. and contained 157 gpl. Fe as the carbonate. The pH was 9.5. The precipitate was washed four times by decantation with a total of 197 parts of water to 1 part iron carbonate. The final sludge, containing 30% by weight of iron carbonate, was filtered and the filter cake used to reduce the acidity of a crystalloidal high acid titanium sulfate starting solution, the composition of which is given below in Table I.

The acidity reducing procedure was as follows: 10,000 grams of the above iron carbonate filter cake, containing 25.6% Fe, were added to 23.7 liters of the starting solution. Rate of addition of iron carbonate was limited only sufficiently to avoid excessive frothing caused by $CO_2$ evolution. Temperature of the mass during the acidity reducing operation was maintained below about 50° C. On completion of reaction, the mixture was cooled to between 12–15° C. to crystallize out part of the ferrous sulfate. Copperas was removed by centrifuging the liquor which was then treated with 100 grams metallic iron (to reduce any ferric iron to ferrous condition) and clarified by filtration. The resulting product, having an acidity factor of minus 9.44% analyzed as shown at the right of Table I.

Table I

|  | Initial high acid solution | Product low acid solution |
|---|---|---|
| Gpl. $TTiO_2$ | 228 | 266 |
| $RTiO_2$ | 2.1 | 5.1 |
| Fe | 92 | 51.5 |
| $TH_2SO_4$ | 616.9 | 385.7 |
| $AH_2SO_4$ | 455.6 | 295.2 |
| $FH_2SO_4$ | 175.8 | Minus 30.8 |
| Per cent F. A. | 63 | Minus 9.44 |
| Ratio $AH_2SO_4/TiO_2$ | 2.00 | 1.18 |
| Sp. gr. | 1.64 | 1.56 |
| Ratio $Fe/TiO_2$ | 0.40 | 0.19 |

The previously stated test showed the product solution was free of colloidal titanium compound.

Following is illustration of practice of the invention using acetone washed basic iron carbonate:

EXAMPLE 2

36 lbs. of soda ash were dissolved in 17 gals. of water and the solution added to 100 lbs. of $FeSO_4 \cdot 7H_2O$ dissolved in 18 gals. of water. The mixture was boiled for about 5 minutes and allowed to settle. The precipitate was washed twice by decantation, filtered, washed further with water, and finally washed with a total of 4 liters of acetone. The cake was sucked dry. The mass contained about 30–35% solids and considerable acetone was held in iron carbonate cake which analyzed as follows:

|  | Per cent |
|---|---|
| Fe as ferrous iron | 25.3 |
| Fe as ferric iron | 3.65 |
| Total Fe | 28.95 |

The crystalloidal high acid factor starting solution used analyzed—

Table II

| | |
|---|---|
| $TTiO_2$ | 200.5 gpl. |
| $RTiO_2$ | 12.0 |
| TFe | 55.2 |
| $TH_2SO_4$ | 490.0 |
| $FH_2SO_4$ | 147.5 |
| $AH_2SO_4$ | 390.5 |
| Ratio $Fe/TiO_2$ | 0.27 |
| Per cent F. A. | 60.2 |

24 lbs. of the ferrous carbonate cake were added to 32.2 liters of above starting solution. During the reaction, temperature varied from 23 to 35° C. On completion of reaction, the liquor analyzed—

Table III

| | |
|---|---|
| $TTiO_2$ | 206 gpl. |
| $RTiO_2$ | 0 |
| TFe | 92 |
| Per cent F. A. | Minus 16.1 |
| pH | .24 |

The solution was allowed to cool to 20° C. and $FeSO_4 \cdot 7H_2O$ crystals were filtered off by centrifuging. The resulting liquor was then treated with metallic iron in quantity sufficient to form 3.5 gpl. $RTiO_2$ to insure reduction of ferric iron. The clear solution was crystalloidal. The entire solution was then gassed with $H_2S$. We find that at the pH existing (.24), the condition of the solution is such that some of the heavy metal impurities may be readily precipitated as sulfides by $H_2S$ gassing. Upon clarification the liquor was brilliant in appearance, of normal color, and crystalloidal as indicated by the specified test. Analysis of the finished solution was—

Table IV

| | |
|---|---|
| $TTiO_2$ | 200 gpl. |
| $RTiO_2$ | 3 |
| TFe | 53.4 |
| Per cent F. A. | Minus 16.1 |
| Sp. gr. | 1.5 at 21° C. |

It is not clear to us why better overall results observed have been obtained by using acetone-washed iron carbonate. It may be that use of treated cake minimizes any possible tendency toward local dilution which might cause development of colloidal titanium.

Following illustrates application of the invention to production of low acidity factor titanium chloride solution.

EXAMPLE 3

A typical crystalloidal stock high acid titanium chloride solution ($TiOCl_2 \cdot 2HCl$) was prepared from pure $TiCl_4$ and analyzed as follows:

Table V

| | |
|---|---|
| $TTiO_2$ | 260 gpl. |
| THCl | 412 |
| FHCl | 174 |
| Per cent F. A. | 73 |
| Sp. gr. | 1.43 at 25° C. |

150 cc. of the above titanium chloride starting solution were diluted from 260 gpl. to 225 gpl. by addition of 23 cc. of water. To this solution was added 83 grams of fairly wet basic iron carbonate filter cake made by procedure similar to that enumerated in Example 1. The ferrous carbonate dissolved and reaction took place rapidly. During reaction, temperature was maintained below about 40° C. On completion of reaction, metallic iron was added in quantity sufficient to reduce the small amount of ferric chloride to ferrous. The liquor was then filtered, and the clarified liquor obtained represented an overall recovery of 95% of the $TiO_2$ content of titanium chloride starting solution. The product analyzed

Table VI

| | |
|---|---|
| $TTiO_2$ | 184.5 gpl. |
| $RTiO_2$ | 1.09 |
| TFe | 102.2 |
| THCl | 292 |
| FHCl | Minus 10.0 |
| Per cent F. A. | Minus 6.0 |
| Sp. gr. | 1.42 at 25° C. |

This product was crystalloidal, as indicated by the prescribed test.

While the acidity factors of the products of all of the above examples are less than zero, it will be understood that products of higher or lower acidity factors may be made by the same procedures, varied only by the amount of iron carbonate used.

We claim:

1. The method for making crystalloidal liquid titanium salt solution of predetermined acidity factor which comprises reacting an initial crystalloidal titanium salt solution, having an acidity factor higher than said predetermined factor, with iron carbonate in amount equivalent to that needed to reduce acidity to said predetermined factor, and maintaining temperature during said reaction at not more than 60° C.

2. The method for making crystalloidal liquid titanium salt solution of predetermined acidity factor which comprises reacting an initial crystalloidal titanium salt solution, having an acidity factor higher than said predetermined factor, with iron carbonate in amount equivalent to that needed to reduce acidity to said predetermined factor, and maintaining temperature during said reaction at not more than 50° C.

3. The method for making crystalloidal liquid titanium salt solution of predetermined acidity factor which comprises reacting an initial crystalloidal titanium salt solution, having an acidity factor higher than said predetermined factor, with precipitated iron carbonate in amount equivalent to that needed to reduce acidity to said predetermined factor, and maintaining temperature during said reaction at not more than 60° C., said iron carbonate being in the form of moist filter cake.

4. The method for making crystalloidal liquid titanium salt solution of predetermined acidity factor which comprises introducing into an initial crystalloidal titanium salt solution, having an acidity factor higher than said predetermined factor, iron carbonate which has been treated with a dehydrating agent in amount equivalent to that needed to reduce acidity to said predetermined factor, and maintaining temperature during the resulting reaction at not more than 60° C.

5. The method for making crystalloidal liquid titanium salt solution of predetermined acidity factor which comprises introducing into an initial crystalloidal titanium salt solution, having an acidity factor higher than said predetermined factor, acetone treated iron carbonate in amount equivalent to that needed to reduce acidity to said predetermined factor, and maintaining temperature during the resulting reaction at not more than 60° C.

6. The method for making crystalloidal liquid titanium sulfate solution of predetermined acidity factor which comprises reacting an initial crystalloidal titanium salt solution, having an acidity factor higher than said predetermined factor, with iron carbonate in amount equivalent to that needed to reduce acidity to said predetermined factor and in the absence of ferric iron, and maintaining temperature during said reaction at not more than 60° C.

7. The method for making crystalloidal liquid titanium salt solution of predetermined acidity factor which comprises reacting an initial crystalloidal titanium salt solution, having an acidity factor higher than said predetermined factor and containing not less than about 10 gpl. of titanous salt, with iron carbonate in amount equivalent to that needed to reduce acidity to said predetermined factor, and maintaining temperature during said reaction at not more than 60° C.

8. The method for reducing the acidity of crystalloidal liquid titanium salt solution without disturbing the crystalloidal properties thereof which comprises reacting said solution with iron carbonate, and maintaining temperature during said reaction at not more than 60° C.

9. The method for reducing the acidity of crystalloidal liquid titanium salt solution without disturbing the crystalloidal properties thereof which comprises reacting said solution with basic iron carbonate, and maintaining temperature during said reaction at not more than 60° C.

10. The method for reducing the acidity of crystalloidal liquid titanium salt solution containing not less than about 10 gpl. of titanous salt without disturbing the crystalloidal properties thereof which comprises introducing into said solution precipitated and acetone treated basic iron carbonate, and maintaining temperature during the resulting reaction at not more than 60° C.

11. The method for reducing the acidity of crystalloidal liquid titanium salt solution without disturbing the crystalloidal properties thereof which comprises reacting said solution with acetone treated iron carbonate, and maintaining temperature of the reacting mass during said reaction at not more than 60° C.

L'ROCHE G. BOUSQUET.
MAXWELL J. BROOKS.